(12) United States Patent
Uchida (10) Patent No.: US 10,746,315 B2
(45) Date of Patent: Aug. 18, 2020

(54) VALVE DEVICE (71) Applicant: DENSO CORPORATION, Kariya, Aichi-pref (JP)

(72) Inventor: Kimio Uchida, Kariya (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 16/270,727

(22) Filed: Feb. 8, 2019

(65) Prior Publication Data
US 2019/0331246 A1 Oct. 31, 2019

(30) Foreign Application Priority Data

Apr. 27, 2018 (JP) .................................. 2018-86406

(51) Int. Cl.
*F16K 31/04* (2006.01)
*F16K 31/50* (2006.01)

(52) U.S. Cl.
CPC .......... *F16K 31/047* (2013.01); *F16K 31/508* (2013.01)

(58) Field of Classification Search
CPC .. F16K 31/047; F16K 31/508; F02M 25/0836
See application file for complete search history.

(56) References Cited

U.S. PATENT DOCUMENTS

| | | | | |
|---|---|---|---|---|
| 9,421,490 B2* | 8/2016 | Kimoto | ............... | B01D 53/0454 |
| 9,470,161 B2* | 10/2016 | Akita | .................... | F02D 41/003 |
| 9,523,316 B2* | 12/2016 | Tagawa | ............... | F02D 41/1402 |
| 2016/0186700 A1 | 6/2016 | Nishiura et al. | | |
| 2017/0356394 A1 | 12/2017 | Murai | | |

* cited by examiner

*Primary Examiner* — Eric Keasel
(74) *Attorney, Agent, or Firm* — Nixon & Vanderhye P.C.

(57) ABSTRACT

A valve guide unit is movably accommodated in a valve housing in an axial direction. A valve member is movably supported in the valve guide unit. A valve-unit supporting member movably supports a female screw member of the valve guide unit. A shaft member connected to an electric motor is screw engaged with the female screw member. A shaft inside space is formed in an inside of the female screw member, while a shaft outside space is formed in the guide-unit supporting member. An air communication passage is formed at an inner wall surface of the female screw member so that the shaft inside space and the shaft outside space are communicated to each other via the air communication passage. A response of a valve device is thereby improved.

6 Claims, 8 Drawing Sheets

VALVE DEVICE

CROSS REFERENCE TO RELATED APPLICATION

This application is based on Japanese Patent Application No. 2018-86406 filed on Apr. 27, 2018, the disclosure of which is incorporated herein by reference.

FIELD OF TECHNOLOGY

The present disclosure relates to a valve device, for example, a valve device for a vaporized fuel processing apparatus.

BACKGROUND

A valve device is known in the art, according to which a valve unit is reciprocated in a valve housing by a rotational torque outputted from an electric motor in order to open or close a fluid flow passage. In one of prior arts, a valve device includes a stepping motor, a ball screw member and a female screw member. In the valve device, the ball screw member is rotated by the rotational torque outputted from the stepping motor, wherein the ball screw member is screwed into the female screw member.

SUMMARY OF THE DISCLOSURE

It is an object of the present disclosure to provide a valve device, which can improve response of the valve device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

The present disclosure will be explained hereinafter by way of multiple embodiments and/or modifications with reference to the drawings. The same reference numerals are given to the same or similar structure and/or portion in order to avoid repeated explanation.

First Embodiment

Figure 1:
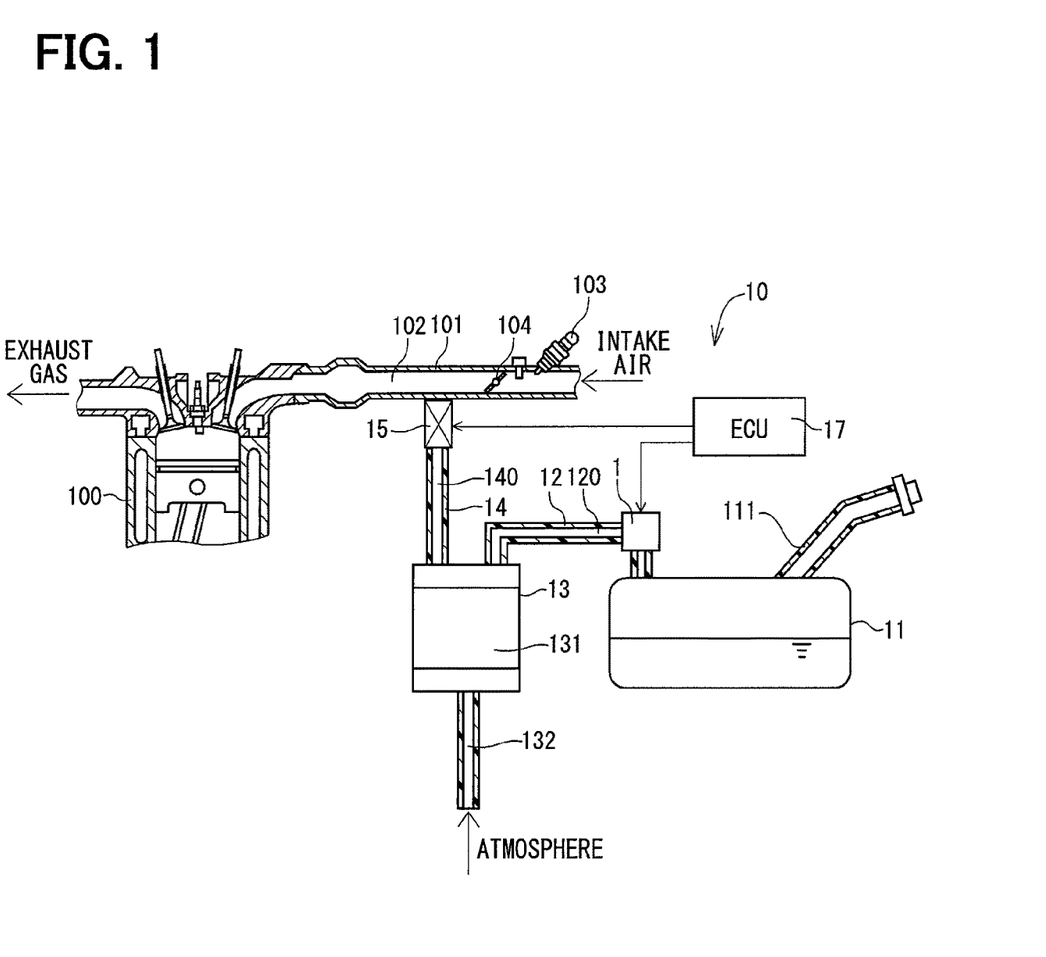
FIG. 1 is a schematic diagram of a vaporized fuel processing apparatus according to a first embodiment of the present disclosure.

A vaporized fuel processing system 10 using a valve device 1 according to a first embodiment of the present disclosure is shown in FIG. 1. The vaporized fuel processing system 10 includes a fuel tank 11, the valve device 1, a canister 13, a purge valve 15, an electronic control unit 17 (hereinafter, the ECU 17), and so on. In the vaporized fuel processing system 10, the canister 13 absorbs and collects fuel vapor generated in the fuel tank 11. The canister 13 purges the collected fuel vapor into an intake air passage 102 of an intake air pipe 101 connected to an internal combustion engine 100 (hereinafter, the engine 100).

The fuel tank 11 stores fuel to be supplied to the engine 100. The fuel tank 11 is connected to the canister 13 via a purge pipe 12. The purge pipe 12 forms a purge passage 120 capable of communicating an inside of the fuel tank 11 and an inside of the canister 13 to each other. The fuel tank 11 is provided with a fuel supply pipe 111 for filling the fuel into the fuel tank 11.

The valve device 1 is provided in the purge pipe 12. The valve device 1 communicates the inside of the fuel tank 11 and the inside of the canister 13 to each other or blocks off the communication between them. The valve device 1 communicates the inside of the fuel tank 11 and the inside of the canister 13 when filling the fuel from an outside into the fuel tank 11 via the fuel supply pipe 111.

The canister 13 includes a canister absorbent 131 for absorbing the fuel vapor generated in the fuel tank 11. The canister 13 is connected to the intake air pipe 101 via a purge pipe 14 forming a purge passage 140.

The purge valve 15 is provided in the purge pipe 14. The purge valve 15 communicates the inside of the canister 13 and the intake air passage 102 to each other or blocks off the communication between them.

The ECU 17 is composed of a CPU serving as computing means, a micro-computer having a RAM and a ROM as storage means, and so on. The ECU 17 is electrically connected to the valve device 1 and the purge valve 15. The ECU 17 opens and closes the valve device 1 according to a traveling state of an automotive vehicle and controls the communication or interruption between the inside of the fuel tank 11 and the inside of the canister 13. Further, the ECU 17 opens and closes the purge valve 15 according to the traveling state of the automotive vehicle. The fuel absorbed in the canister absorbent 131 is discharged into air, which flows into the canister 13 via an atmospheric passage 132 provided to the canister 13. The air and the fuel discharged from the canister absorbent 131 flow together and they are supplied into the intake air passage 102 via the purge passage 140. The fuel from the canister 13 is supplied to the intake air passage 102 at a downstream side of a fuel injection valve 103 and a throttle valve 104.

Figure 2:
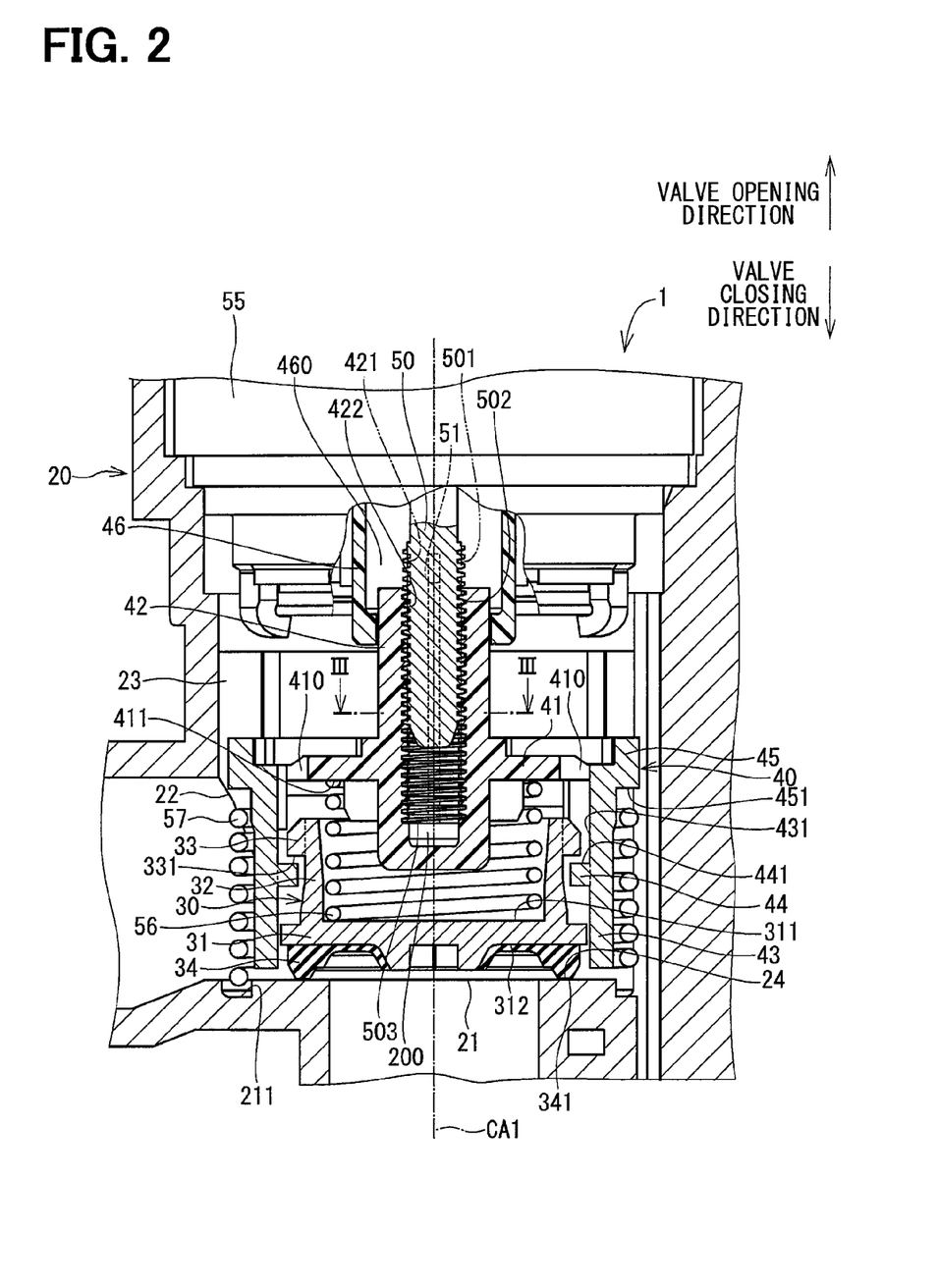
FIG. 2 is a schematic cross-sectional view showing the valve device of the first embodiment.

A structure of the valve device 1 will be explained with reference to FIG. 2. The valve device 1 includes a valve housing 20, a valve member 30, a valve guide unit 40, a shaft member 50, an electric motor 55, a first coil spring 56 (a first biasing member), a second coil spring 57 (a second biasing member), and so on. In FIG. 2, a direction in which the valve member 30 is moved and separated from a valve seat 24 to open a fuel-vapor inlet port 21 (a fluid inlet port) is indicted as a valve opening direction. A direction in which the valve member 30 is moved and brought into contact with the valve seat 24 to close the fuel-vapor inlet port 21 is indicated as a valve closing direction.

The valve housing 20 is a part of the valve device 1, which is made of metal and formed in a box shape. The valve housing 20 is provided in the purge pipe 12. The valve housing 20 has the fuel-vapor inlet port 21, a fuel-vapor outlet port 22 (a fluid outlet port 22), a valve chamber 23 and the valve seat 24.

The fuel-vapor inlet port 21 is formed on a lower side of the valve housing 20 in the drawing sheet of FIG. 2. The fuel-vapor inlet port 21 is communicated to the fuel tank 11 via a first part of the purge passage 120.

The fuel-vapor outlet port 22 is formed on a left-hand side of the valve housing 20 in the drawing sheet of FIG. 2. The fuel-vapor outlet port 22 is communicated to the inside of the canister 13 via a second part of the purge passage 120.

The valve chamber 23 is formed in the valve housing 20 so that the fuel-vapor inlet port 21 and the fuel-vapor outlet port 22 are communicated to each other through the valve chamber 23. As shown in FIG. 2, the valve chamber 23 movably accommodates the valve member 30, the valve guide unit 40 and the shaft member 50.

The valve seat 24 is formed in a part of an inner wall surface of the valve chamber 23, which is formed at an outer periphery of the fuel-vapor inlet port 21. When the valve member 30 is brought into contact with the valve seat 24, the fuel-vapor inlet port 21 is closed. When the valve member 30 is separated from the valve seat 24, the fuel-vapor inlet port 21 is opened. When the fuel-vapor inlet port 21 is opened, the fuel vapor generated in the fuel tank 11 passes through the valve housing 20, more exactly, through the fuel-vapor inlet port 21, the valve chamber 23 and the fuel-vapor outlet port 22, and the fuel vapor flows into the canister 13.

The valve member 30 is movably accommodated in the valve chamber 23, so that the valve member 30 is movable relative to the valve housing 20 in an axial direction. The valve member 30 is formed in a substantially cylindrical shape having a closed bottom end. The valve member 30 has a valve bottom portion 31, a cylindrical wall portion 32, a large-diameter portion 33 and a lower end portion 34 (a seal member 34). In the present embodiment, the valve bottom portion 31, the cylindrical wall portion 32 and the large-diameter portion 33 are integrally formed with one another and made of metal.

The valve bottom portion 31 is a disc-shaped part of the valve member 30 and is substantially perpendicular to the axial direction, in which the valve member 30 is moved in the valve opening direction or in the valve closing direction as shown in FIG. 2. The valve bottom portion 31 is formed such that its outer diameter is larger than an outer diameter of the cylindrical wall portion 32. As a result, an outer peripheral portion of the valve bottom portion 31 protrudes in a radial outward direction of the cylindrical wall portion 32.

The cylindrical wall portion 32 is a cylindrical part of the valve member 30 and connected to an upper-side surface 311 (a surface on a valve opening side) of the valve bottom portion 31. The first coil spring 56 is accommodated in a radial-inside space of the cylindrical wall portion (explained below).

The large-diameter portion 33 is an annular part of the valve member 30 and located at an axial upper end of the cylindrical wall portion 32, that is, on the valve opening side. The large-diameter portion 33 is so formed as to protrude in the radial outward direction of the cylindrical wall portion 32.

The seal member 34 is provided on a lower-side surface 312 of the valve bottom portion 31 (a surface on the valve closing side). The seal member 34 is made of elastic material. An outer peripheral annular portion of the seal member 34 is formed in a convex shape on a lower-side surface 341 thereof (a surface on the valve closing side), so that the outer peripheral annular portion on the lower-side surface 341 protrudes in an axial downward direction (the valve closing direction). The lower-side surface 341 of the seal member 34 is operatively brought into contact with the valve seat 24.

The valve guide unit 40 is a unit arranged at a radial outside and an axial upper-side position of the valve member 30. The valve guide unit 40 has a supporting member 41, a guide-side screw member 42 (a female screw member 42), a guide-side cylindrical wall member 43, an inside projecting portion 44 (a stopper portion 44) and a spring supporting portion 45. In the present embodiment, the supporting member 41, the guide-side screw member 42, the guide-side cylindrical wall member 43, the inside projecting portion 44 and the spring supporting portion 45 are integrally formed with one another. The valve guide unit 40 is movably accommodated in the valve chamber 23, so that the valve guide unit 40 is movable relative to the valve housing 20 in the axial direction.

The supporting member 41 is a disc-shaped part and located at an axial upper side of the valve member 30 in the valve opening direction. The supporting member 41 is so provided as to be substantially perpendicular to the axial direction, in which the valve member 30 is moved in the valve opening direction or in the valve closing direction. The supporting member 41 supports an upper-side end of the first coil spring 56 (that is, an axial end on the valve opening side). The supporting member 41 has a plurality of communication holes 410 between the guide-side cylindrical wall member 43 and the supporting member 41. The communication holes 410 communicate an inside and an outside of the valve guide unit 40 to each other.

The guide-side screw member 42 (the female screw member) is a cylindrical part having a closed bottom end, which is arranged on a center axis CA1 of the valve device 1. The guide-side screw member 42 is so provided as to pass through a center of the supporting member 41. The guide-side screw member 42 has a female screw portion 422 at its inner wall surface 421.

The guide-side cylindrical wall member 43 is a cylindrical part provided at an outer periphery of the supporting member 41. The guide-side cylindrical wall member 43 extends from the supporting member 41 in an axial downward direction (in the valve closing direction). The guide-side cylindrical wall member 43 is located at a radial outside position of the valve bottom portion 31 and the large-diameter portion 33 of the valve member 30. The guide-side cylindrical wall member 43 has the inside projecting portion 44 and the spring supporting portion 45. The guide-side cylindrical wall member 43 guides a reciprocal movement of the valve member 30 in the axial direction.

The inside projecting portion 44 (the stopper portion 44) is an annular part formed at an inner wall surface 431 of the guide-side cylindrical wall member 43. The inside projecting portion 44 is so formed as to protrude in a radial inward direction from the inner wall surface 431 of the guide-side cylindrical wall member 43. The inside projecting portion 44 has a contact surface 441, which is operatively brought into contact with a contact surface 331 of the large-diameter portion 33 (an axial end surface on the valve closing side).

The spring supporting portion 45 is an annular projecting part formed at an outer periphery of the guide-side cylindrical wall member 43. The spring supporting portion 45 supports an upper-side end of the second coil spring 57 (an axial end on the valve opening side).

An upper-side end of the guide-side screw member 42 (an axial end on the valve opening side) is movably supported by a guide-unit supporting member 46, which is formed as a separate member from the valve guide unit 40 and connected to the electric motor 55. The valve guide unit 40 is movable in the axial direction along the center axis CA1 of the valve device 1 in a reciprocating manner. As shown in FIG. 2, the guide-unit supporting member 46 is formed in a substantially cylindrical shape and movably supports the valve guide unit 40 at an outer peripheral surface of the guide-side screw member 42.

The shaft member 50 is composed of, for example, a ball screw and inserted into the guide-side screw member 42 in such a way that the shaft member 50 is rotatable with respect to the guide-side screw member 42. The shaft member 50 has a male screw portion 502 at its outer wall surface 501, so that the male screw portion 502 is screw engaged with the female screw portion 422 of the guide-side screw member 42.

Figure 3:
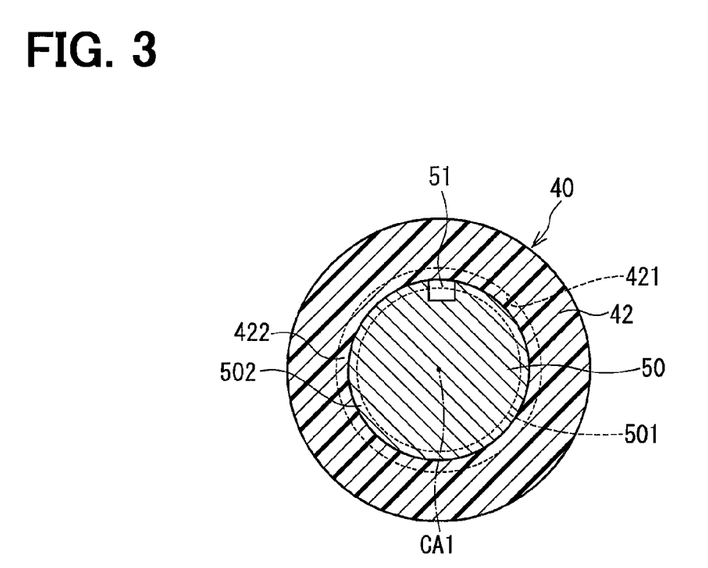
FIG. 3 is a schematic cross-sectional view taken along a line III-III in FIG. 2.

As shown in FIGS. 2 and 3, the shaft member 50 has a shaft-side groove 51 as an air communication passage, which is formed on the outer wall surface 501 of the shaft member 50. A shaft inside space 200 is formed in an inside of the guide-side screw member 42 at a forward end of the shaft member 50, which is defined by an axial end surface 503 of the shaft member 50 on the valve closing side and the inner wall surface 421 of the guide-side screw member 42. A shaft outside space 460 is formed in the guide-unit supporting member 46 at an outer periphery of the male screw portion 502 of the shaft member 50. The shaft inside space 200 and the shaft outside space 460 are communicated to each other via the shaft-side groove 51 (the air communication passage 51).

The electric motor 55 is provided on an upper side of the supporting member 41, that is, on the valve opening side. The electric motor 55 is fixed to the valve housing 20 in such a way that a relative movement of the electric motor 55 with respect to the valve housing 20 is not allowed. The electric motor 55 is connected to the shaft member 50 and outputs rotational torque capable of rotating the shaft member 50 according to a command signal from the ECU 17.

The first coil spring 56 is accommodated in the valve member 30. One end of the first coil spring 56 is supported by the upper-side surface 311 of the valve bottom portion 31, while the other end thereof is supported by a lower-side surface 411 of the supporting member 41 (that is, the surface on the valve closing side). The first coil spring 56 generates a first biasing force for biasing the valve member 30 in the valve closing direction, that is, in a direction in which the valve member 30 and the valve seat 24 are brought into contact with each other.

The second coil spring 57 is provided at a radial outward side of the guide-side cylindrical wall member 43 of the valve guide unit 40. One end of the second coil spring 57 (a lower-side end) is supported by an inner surface 211 of the valve housing 20 around the valve seat 24, while the other end thereof (an upper-side end) is supported by a lower-side surface 451 of the spring supporting portion 45 (that is, a surface on the valve closing side). The second coil spring 57 generates a second biasing force for biasing the valve guide unit 40 in the valve opening direction, that is, in a direction in which the valve guide unit 40 is axially separated from the valve seat 24. As above, a backlash between the female screw portion 422 and the male screw portion 502 is absorbed.

An operation of the valve device 1 will be explained. When the valve device 1 is in a valve closed condition shown in FIG. 2, the seal member 34 and the valve seat 24 are in contact with each other. When the electric motor 55 is driven to rotate, the shaft member 50 is rotated from the valve closed condition of FIG. 2. In the present embodiment, for example, when the shaft member 50 is rotated in a clockwise direction when viewing it from a side of the electric motor 55, a relative position between the male screw portion 502 and the female screw portion 422 is changed in such a way that the valve guide unit 40 is moved with respect to the shaft member 50 in the valve opening direction. When the valve guide unit 40 is moved with respect to the shaft member 50 in the valve opening direction, the contact surface 441 of the inside projecting portion 44 is axially brought into contact with the contact surface 331 of the large-diameter portion 33. When the valve guide unit 40 is further moved in the valve opening direction while the contact surface 441 and the contact surface 331 are in contact with each other, the valve member 30 is correspondingly moved in the valve opening direction. As a result, the seal member 34 is separated from the valve seat 24 so that the fuel-vapor inlet port 21 is opened. When the fuel-vapor inlet port 21 is opened, the fuel-vapor inlet port 21 and the fuel-vapor outlet port 22 are communicated to each other via the valve chamber 23.

On the other hand, when the shaft member 50 is rotated in an anti-clockwise direction when viewing it from the side of the electric motor 55, the relative position between the male screw portion 502 and the female screw portion 422 is changed in such a way that the valve guide unit 40 is moved with respect to the shaft member 50 in the valve closing direction from a valve opened position, in which the seal member 34 is separated from the valve seat 24. When the valve guide unit 40 is moved in the valve closing direction with respect to the shaft member 50, the valve member 30 engaged with the inside projecting portion 44 is also moved in the valve closing direction. As a result, the seal member 34 of the valve member 30, which is biased in the valve closing direction by the first coil spring 56, is brought into contact with the valve seat 24. The fuel-vapor inlet port 21 is thereby closed.

The following advantages are obtained in the valve device 1 of the first embodiment:

(A1) In the valve device 1 of the first embodiment, the shaft-side groove 51 (the air communication passage) is so formed as to communicate the shaft inside space 200 defined by the axial end surface 503 of the shaft member 50 and the inner wall surface 421 of the guide-side screw member 42 (the female screw member) to the shaft outside space 460 formed inside of the guide-unit supporting member 46. When the guide-side screw member 42 having the female screw portion 422 is moved relative to the shaft member 50 having the male screw portion 502, the air in the shaft inside space 200 flows out to the shaft outside space 460 via the air communication passage 51, or the air flows from the shaft outside space 460 into the shaft inside space 200. As a result, it is possible to smoothly move the valve member 30 without being affected by the pressure of the air in the shaft inside space 200. Therefore, in the first embodiment, it is possible to improve the response of the valve member 30, when compared with a case in which the air communication passage is not formed and thereby air flow from or to the shaft inside space 200 is restricted by a small gap between the male screw portion and the female screw portion.

(A2) In the valve device 1 of the first embodiment, the shaft-side groove 51 (the air communication passage) is formed at the outer wall surface 501 of the shaft member 50. When the male screw portion 502 is formed at the outer wall surface 501 of the shaft member 50, the shaft-side groove 51 is formed at first. Then, the shaft-side groove 51 is chucked to form the male screw portion 502. Accordingly, it is possible to easily process the male screw portion 502. Therefore, in the first embodiment, it is possible to reduce manufacturing cost of the valve device 1.

Second Embodiment

A valve device according to a second embodiment of the present disclosure will be explained with reference to FIG. 4, which shows only a part of the valve device. The second embodiment is different from the first embodiment in a position of the air communication passage.

Figure 4:
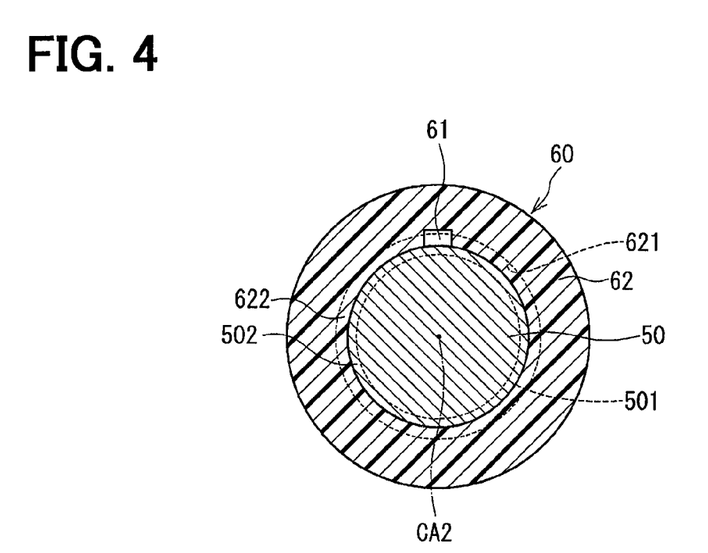
FIG. 4 is a schematic cross-sectional view showing relevant portions of a valve device according to a second embodiment.

In a similar manner to the first embodiment, the valve device of the second embodiment includes the valve housing 20, the valve member 30, a valve guide unit 60, the shaft member 50, the electric motor 55, the first coil spring 56, the second coil spring 57 and so on, although not all of them are shown in FIG. 4.

The valve guide unit 60 is the unit arranged at the radial outside and the axial upper-side position of the valve member 30. The valve guide unit 60 has the supporting member 41, a guide-side screw member 62 (the female screw member), the guide-side cylindrical wall member 43, the inside projecting portion 44 (the stopper portion 44) and the spring supporting portion 45.

As shown in FIG. 4, the guide-side screw member 62 is a cylindrical part having the closed bottom end, which is arranged on a center axis CA2 of the valve device 1. The guide-side screw member 62 is so provided as to pass through the center of the supporting member 41. The guide-side screw member 62 has a female screw portion 622 on its inner wall surface 621. An axial end portion of the guide-side screw member 62 on the valve opening side (an upper side end) is so supported by the guide-unit supporting member 46 as to be reciprocally movable in the axial direction along the center axis CA2.

As shown in FIG. 4, the guide-side screw member 62 gas a guide-side groove 61 (the air communication passage) at the inner wall surface 621. In the same manner to the first embodiment, the shaft inside space 200 (not shown in FIG. 4) is formed in the inside of the guide-side screw member 62, which is defined by the axial end surface 503 of the shaft member 50 on the valve closing side and the inner wall surface 621 of the guide-side screw member 62. The shaft outside space 460 (not shown in FIG. 4) is formed in the guide-unit supporting member 46. The shaft inside space 200 and the shaft outside space 460 are communicated to each other via the guide-side groove 61 (the air communication passage).

As above, the valve device according to the second embodiment has the guide-side groove 61, which communicates the shaft inside space 200 formed in the guide-side screw member 62 and the shaft outside space 460 formed in the guide-unit supporting member 46 to each other. Accordingly, the second embodiment obtains the same advantages to those of the first embodiment.

Third Embodiment

Figure 5:
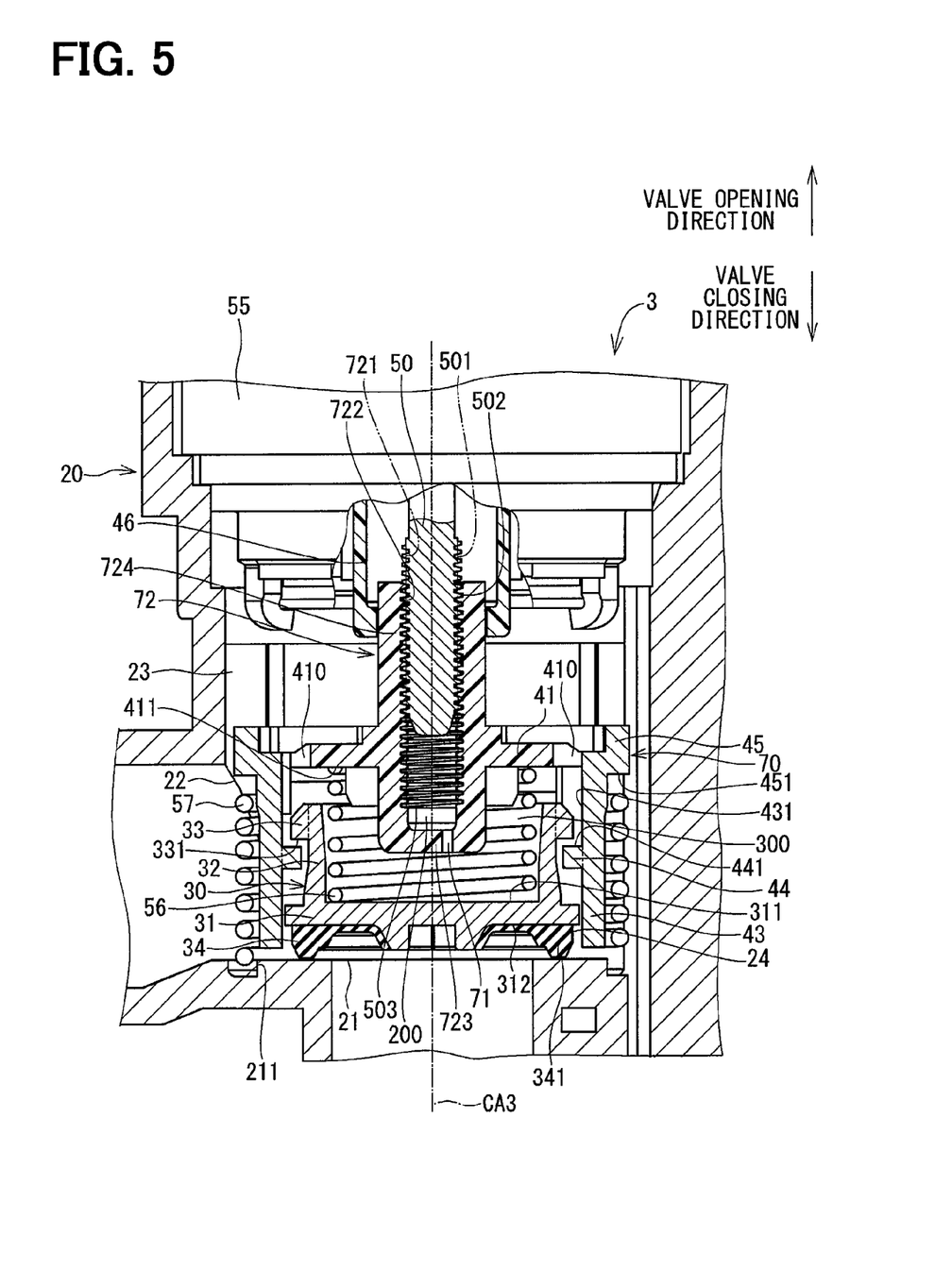
FIG. 5 is a schematic cross-sectional view showing a valve device according to a third embodiment.

A valve device 3 according to a third embodiment of the present disclosure will be explained with reference to FIG. 5. The third embodiment is also different from the first embodiment in the position of the air communication passage.

In a similar manner to the first embodiment, the valve device 3 of the third embodiment includes the valve housing 20, the valve member 30, a valve guide unit 70, the shaft member 50, the electric motor 55, the first coil spring 56, the second coil spring 57 and so on.

The valve guide unit 70 is the unit arranged at the radial outside and the axial upper-side position of the valve member 30. The valve guide unit 70 has the supporting member 41, a guide-side screw member 72 (the female screw member), the guide-side cylindrical wall member 43, the inside projecting portion 44 (the stopper portion 44) and the spring supporting portion 45.

The guide-side screw member 72 is a cylindrical part having the closed bottom end, which is arranged on a center axis CA3 of the valve device 3. The guide-side screw member 72 is so provided as to pass through the center of the supporting member 41. The guide-side screw member 72 has a female-screw bottom portion 723 and a female-screw cylindrical portion 724. The female-screw bottom portion 723 and the female-screw cylindrical portion 724 are collectively referred to as a female-screw wall portion.

The female-screw bottom portion 723 is a disc-shaped portion positioned on a valve closing side of the guide-side screw member 72. The female-screw bottom portion 723 has a through-hole 71 as the air communication passage, which communicates a space 300 formed in the valve member 30 and the shaft inside space 200 to each other. The space 300, which is formed at an outside of the guide-side screw member 72 on the valve closing side, works as the shaft outside space. The shaft inside space 200 is formed in the guide-side screw member 72 on the valve closing side. The through-hole 71 has a circular cross section and is so formed as to penetrate through the female-screw bottom portion 723 in the axial direction in parallel to the center axis CA3. The through-hole 71 is formed in the female-screw bottom portion 723 at a position deviated from the center axis CA3 in the radial direction.

The female-screw cylindrical portion 724 is a cylindrical portion provided at a position on a valve opening side (an upper side) of the female-screw bottom portion 723. The female-screw cylindrical portion 724 has a female screw portion 722 at its inner wall surface 721. An upper end portion of the female-screw cylindrical portion 724 (the end portion on the valve opening side) is movably supported by the guide-unit supporting member 46 to be reciprocally movable in the axial direction along the center axis CA3.

In the same manner to the first embodiment, the guide-side screw member 72 has the shaft inside space 200, which is defined by the axial end surface 503 of the shaft member 50 and the inner wall surface 721 of the guide-side screw member 72. The shaft inside space 200 is communicated through the through-hole 71 to the shaft outside space 300 formed in the valve member 30.

As above, the valve device 3 according to the third embodiment has the through-hole 71, which communicates the shaft inside space 200 formed in the guide-side screw member 72 and the shaft outside space 300 formed in the valve member 30 to each other. Accordingly, the third embodiment obtains the same advantages to those of the first embodiment.

In the valve device 3 of the third embodiment, the through-hole 71 is formed in the female-screw bottom portion 723 at the position deviated from the center axis CA3 in the radial direction. When the female screw portion 722 is formed at the inner wall surface 721 of the guide-side screw member 72, the through-hole 71 is formed at first. Then, the through-hole 71 is chucked to form the female screw portion 722. Accordingly, it is possible to easily process the female screw portion 722. As above, in the valve device 3 of the third embodiment, it is possible to reduce the manufacturing cost of the valve device 3.

Fourth Embodiment

Figure 6:
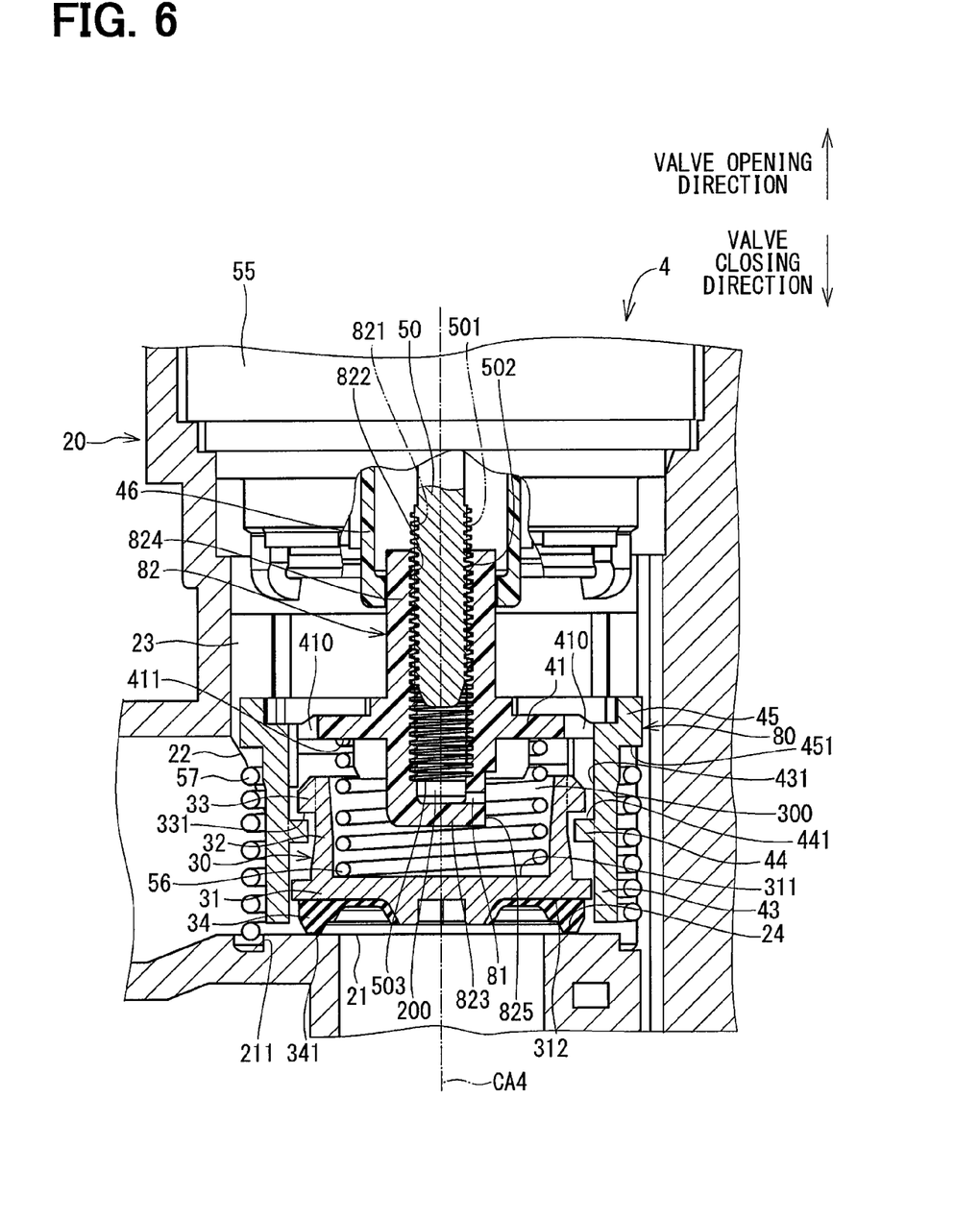
FIG. 6 is a schematic cross-sectional view showing a valve device according to a fourth embodiment.

A valve device 4 according to a fourth embodiment of the present disclosure will be explained with reference to FIG. 6. The fourth embodiment is also different from the first embodiment in the position of the air communication passage.

In a similar manner to the first embodiment, the valve device 4 of the fourth embodiment includes the valve housing 20, the valve member 30, a valve guide unit 80, the shaft member 50, the electric motor 55, the first coil spring 56, the second coil spring 57 and so on.

The valve guide unit 80 is the unit arranged at the radial outside and the axial upper-side position of the valve member 30. The valve guide unit 80 has the supporting member 41, a guide-side screw member 82 (the female screw member), the guide-side cylindrical wall member 43, the inside projecting portion 44 (the stopper portion 44) and the spring supporting portion 45.

The guide-side screw member 82 is a cylindrical part having the closed bottom end, which is arranged on a center axis CA4 of the valve device 4. The guide-side screw member 82 is so provided as to pass through the center of the supporting member 41. The guide-side screw member 82 has a female-screw bottom portion 823 and a female-screw cylindrical portion 824. The female-screw bottom portion 823 and the female-screw cylindrical portion 824 are collectively referred to as the female-screw wall portion.

The female-screw bottom portion 823 is a disc-shaped portion positioned on the valve closing side of the guide-side screw member 82.

The female-screw cylindrical portion 824 is a cylindrical portion provided at a position on the valve opening side (on the upper side) of the female-screw bottom portion 823. The female-screw cylindrical portion 824 has a female screw portion 822 at its inner wall surface 821. An upper end portion of the female-screw cylindrical portion 824 (the end portion on the valve opening side) is movably supported by the guide-unit supporting member 46 to be reciprocally movable in the axial direction along the center axis CA4.

The female-screw cylindrical portion 824 has a through-hole 81 as the air communication passage, which penetrates the female-screw cylindrical portion 824 in the radial direction perpendicular to the center axis CA4. The through-hole 81 is so formed in the female-screw cylindrical portion 824 as to open at an outer wall surface 825, which is a part of the outer wall surface of the female-screw cylindrical portion 824 and formed in a flat surface shape at a position adjacent to the female-screw bottom portion 823.

In the same manner to the first embodiment, the guide-side screw member 82 has the shaft inside space 200, which is defined by the axial end surface 503 of the shaft member 50 and the inner wall surface 821 of the guide-side screw member 82. The shaft inside space 200 is communicated through the through-hole 81 to the shaft outside space 300 formed in the valve member 30.

As above, the valve device 4 according to the fourth embodiment has the through-hole 81, which communicates the shaft inside space 200 formed in the guide-side screw member 82 and the shaft outside space 300 formed in the valve member 30 to each other. Accordingly, the fourth embodiment obtains the same advantages to those of the first embodiment.

In the valve device 4 of the fourth embodiment, the through-hole 81 is so formed as to pass through the female-screw cylindrical portion 824 in the radial direction perpendicular to the center axis CA4. In addition, the through-hole 81 is opened at the outer wall surface 825 formed in the flat surface shape. When the female screw portion 822 is formed at the inner wall surface 821 of the guide-side screw member 82, the through-hole 81 is formed at first. Then, the through-hole 81 as well as the outer wall surface 825 is chucked to form the female screw portion 822. Accordingly, it is possible to easily process the female screw portion 822. As above, in the valve device 4 of the fourth embodiment, it is possible to reduce the manufacturing cost of the valve device 4.

Fifth Embodiment

A valve device 5 according to a fifth embodiment of the present disclosure will be explained with reference to FIGS. 7 and 8. The fifth embodiment is also different from the first embodiment in the position of the air communication passage.

In a similar manner to the first embodiment, the valve device 5 of the fifth embodiment includes the valve housing 20, the valve member 30, the valve guide unit 40, a shaft member 85, the electric motor 55, the first coil spring 56, the second coil spring 57 and so on.

The shaft member 85 is composed of, for example, the ball screw and inserted into the guide-side screw member 42 (the female screw member) in such a way that the shaft member 85 is rotatable with respect to the guide-side screw member 42. The shaft member 85 has a male screw portion 852 at its outer wall surface 851, so that the male screw portion 852 is screw engaged with the female screw portion 422 of the guide-side screw member 42.

Figure 7:
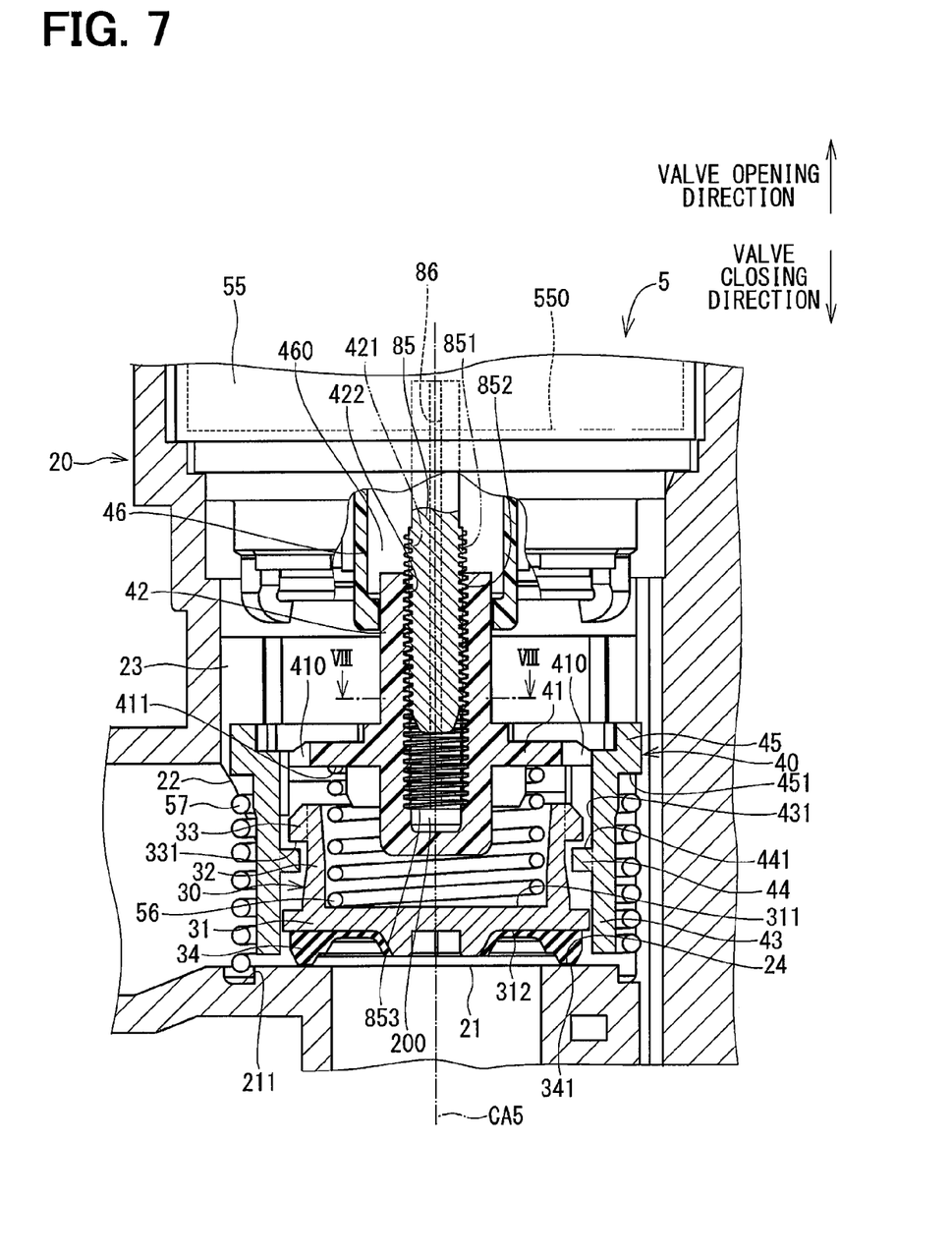
FIG. 7 is a schematic cross-sectional view showing a valve device according to a fifth embodiment.
Figure 8:
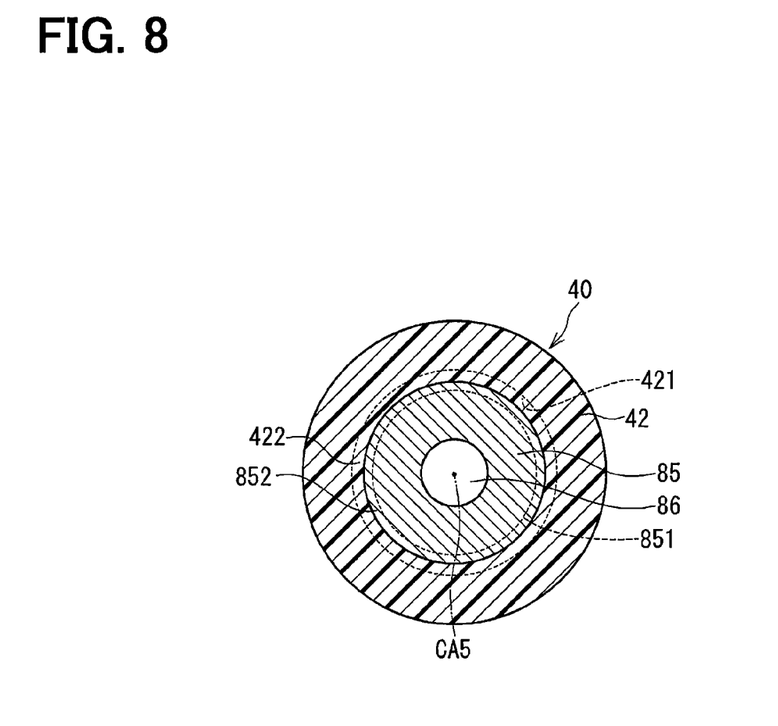
FIG. 8 is a schematic cross-sectional view taken along a line VIII-VIII in FIG. 7.

As shown in FIGS. 7 and 8, the shaft member 85 has a through-hole 86 (the air communication passage), which axially extends in the inside of the shaft member 85 at a position on a center axis CA5 of the valve device 5. In the same manner to the first embodiment, the shaft inside space 200 is formed in the inside of the guide-side screw member 42, which is defined by an axial end surface 853 of the shaft member 85 on the valve closing side and the inner wall surface 421 of the guide-side screw member 42. A motor inside space 550 is formed as the shaft outside space. The shaft inside space 200 and the shaft outside space 550 are communicated to each other via the through-hole 86 (the air communication passage).

As above, the valve device 5 according to the fifth embodiment has the through-hole 86 (the air communication passage), which communicates the shaft inside space 200 formed in the guide-side screw member 42 and the shaft outside space 550 formed in the electric motor 55 to each other. Accordingly, the fifth embodiment obtains the same advantages to those of the first embodiment.

In the valve device 5 of the fifth embodiment, the shaft member 85 can be made from, for example, a cylindrical member. In other words, it is not necessary to specifically process the air communication passage. As a result, in the valve device 5 of the fifth embodiment, it is possible to reduce the manufacturing cost of the valve device 5.

Sixth Embodiment

Figure 9:
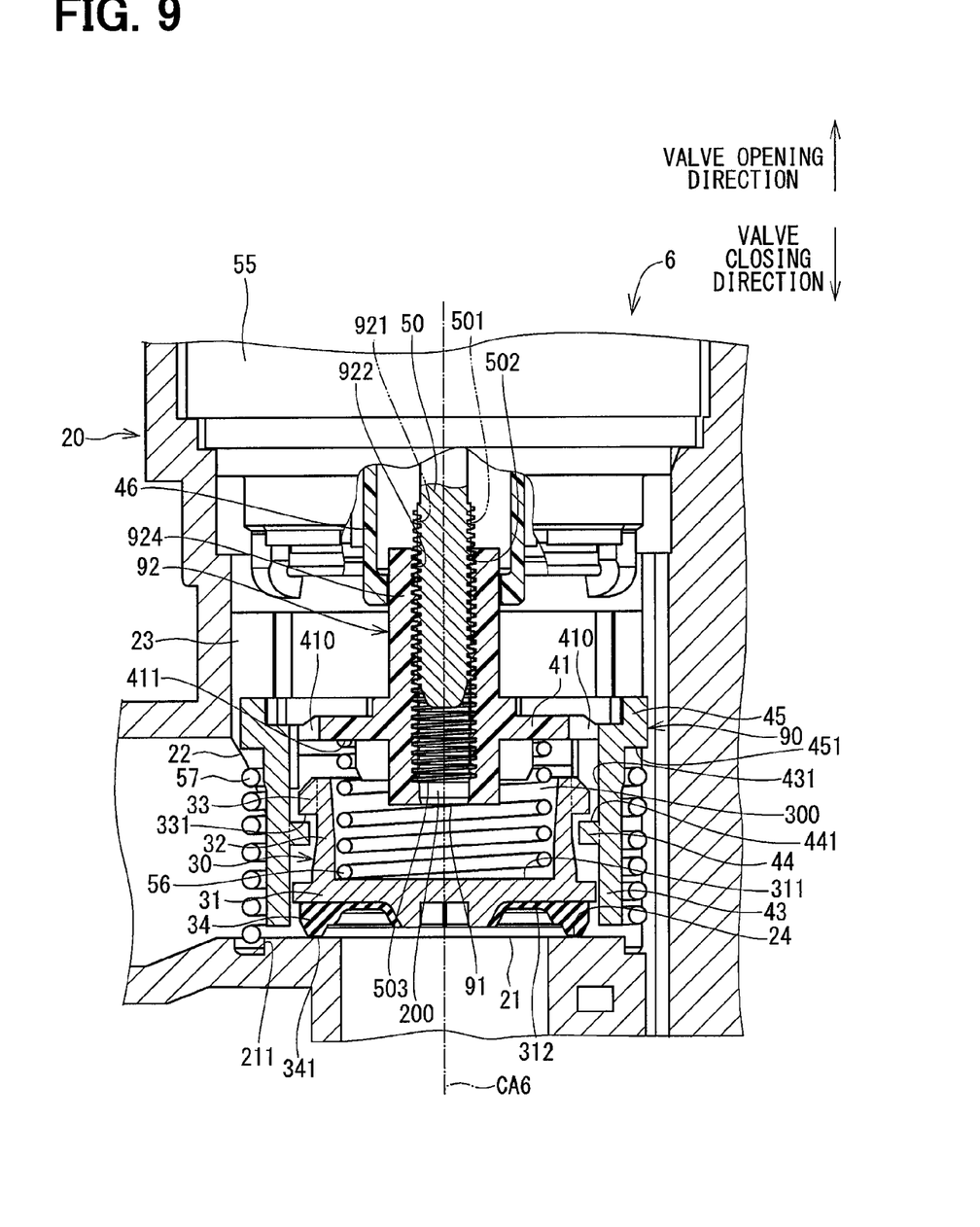
FIG. 9 is a schematic cross-sectional view showing a valve device according to a sixth embodiment.

A valve device 6 according to a sixth embodiment of the present disclosure will be explained with reference to FIG.

9. The sixth embodiment is likewise different from the first embodiment in the position of the air communication passage.

In a similar manner to the first embodiment, the valve device 6 of the sixth embodiment includes the valve housing 20, the valve member 30, a valve guide unit 90, the shaft member 50, the electric motor 55, the first coil spring 56, the second coil spring 57 and so on.

The valve guide unit 90 is the unit arranged at the radial outside and the axial upper-side position of the valve member 30. The valve guide unit 90 has the supporting member 41, a guide-side screw member 92 (the female screw member), the guide-side cylindrical wall member 43, the inside projecting portion 44 (the stopper portion 44) and the spring supporting portion 45.

The guide-side screw member 92 is a cylindrical part, which is arranged on a center axis CA6 of the valve device 6. The guide-side screw member 92 has a female-screw cylindrical portion 924 as the female-screw wall portion. The female-screw cylindrical portion 924 axially extends at a center of the supporting member 41. The female-screw cylindrical portion 924 has an axial open end 91 as the air communication passage at an axial end on the valve closing side. The axial open end 91 communicates the shaft inside space 200, which is formed in the female-screw cylindrical portion 924 at the axial end surface 503 of the shaft member 50, to the shaft outside space 300 formed in the valve member 30.

As above, the valve device 6 according to the sixth embodiment has the axial open end 91 working as the air communication passage, which communicates the shaft inside space 200 formed in the guide-side screw member 92 and the shaft outside space 300 formed in the valve member 30 to each other. Accordingly, the sixth embodiment obtains the same advantages to those of the first embodiment.

Further Embodiments and/or Modifications

In the first and the second embodiments, the valve device 1 has the shaft inside space 200 formed in the guide-side screw member 42 and the shaft outside space 460 formed in the guide-unit supporting member 46, wherein the shaft inside space 200 and the shaft outside space 460 are communicated to each other through the air communication passage (the shaft-side groove 51 or the guide-side groove 61). In each of the third, the fourth and the sixth embodiments, the valve device 3, 4 or 6 has the shaft outside space 300 formed in the valve member 30. In the fifth embodiment, the valve device 5 has the shaft outside space 550 formed in the electric motor 55. However, the shaft outside space is not limited to the space in the above embodiments.

In the third embodiment (FIG. 5), the through-hole 71 (the air communication passage) is formed to have the circular cross section and located at the position deviated from the center axis CA3 of the valve device 3 in the radial direction. However, the shape and the position of the through-hole 71 are not limited thereto. For example, the through-hole 71 may be formed at a position of the center axis CA3 of the valve device 3. In a case that the cross-sectional shape of the through-hole 71 is formed in an elliptical shape or a hexagonal shape, the through-hole 71 can be utilized as a rotation stopper when processing the female screw portion 722.

In the fourth embodiment (FIG. 6), the guide-side screw member 82 has one flat surface portion 825, at which the through-hole 81 is opened to the outside of the guide-side screw member 82. However, multiple flat surface portions may be formed at the outer wall surface of the guide-side screw member 82. In this case, it becomes much easier to chuck the guide-side screw member 82 when the female screw portion 822 is processed.

In the fifth embodiment (FIG. 7), the shaft member 85 has the through-hole 86, which axially extends in the inside of the shaft member 85 at the position on the center axis CA5 of the valve device 5. However, the through-hole 86 (the air communication passage) may not be necessarily located on the center axis CA5 of the valve device 5.

The present disclosure is not limited to the above embodiments and/or the modifications but can be further modified in various manners without departing from a spirit of the present disclosure.

What is claimed is:

1. A valve device comprising:
   (a) a valve housing having;
      a fluid inlet port;
      a fluid outlet port; and
      a valve seat formed at a position neighboring to one of the fluid inlet port and the fluid outlet port;
   (b) a valve member movably provided in the valve housing in such a manner that the valve member closes the fluid inlet port or the fluid outlet port when an axial end of the valve member is brought into contact with the valve seat, while the valve member opens the fluid inlet port or the fluid outlet port when the axial end of the valve member is separated from the valve seat;
   (c) a valve guide unit formed as a separate part from the valve member and movably provided in the valve housing, the valve guide unit including a stopper portion with a contact surface which is operatively brought into contact with a contact surface of the valve member in an axial direction;
   (d) a first biasing member for biasing the valve member in a valve closing direction in which the valve member is going to be in contact with the valve seat;
   (e) a supporting member movably provided in the valve housing and movable together with the valve guide unit, the supporting member supporting one end of the first biasing member on a side opposite to the valve seat;
   (f) a female screw member formed in a cylindrical shape and integrally formed with the supporting member, wherein a female screw portion is formed at an inner wall surface of the female screw member;
   (g) a second biasing member for biasing the female screw member in a valve opening direction so that the female screw member is moved in a direction away from the valve seat;
   (h) a shaft member having a male screw portion at an outer wall surface, so that the male screw portion is engaged with the female screw portion;
   (i) an electric motor for rotating the shaft member; and
   (j) an air communication passage formed in the female screw member and/or the shaft member for communicating a shaft inside space and a shaft outside space to each other,
   wherein the shaft inside space is formed in an inside of the female screw member, while the shaft outside space is formed at an outside of the female screw member.

2. The valve device according to claim 1, wherein
the air communication passage is formed at the outer wall surface of the shaft member.

3. The valve device according to claim 1, wherein
the air communication passage is formed at the inner wall surface of the female screw member.

4. The valve device according to claim 1, wherein
the air communication passage is formed in a female-screw wall portion of the female screw member.

5. The valve device according to claim 1, wherein
the air communication passage is formed in an inside of the shaft member.

6. The valve device according to claim 1, wherein
the shaft outside space includes one of the following spaces;
a space formed in a guide-unit supporting member for movably supporting the valve guide unit;
a space formed in the valve member; and
a space formed in the electric motor.

* * * * *